May 25, 1943.　　　E. F. HUDDLE　　　2,320,134
HARVESTER
Filed April 20, 1942　　　3 Sheets-Sheet 3
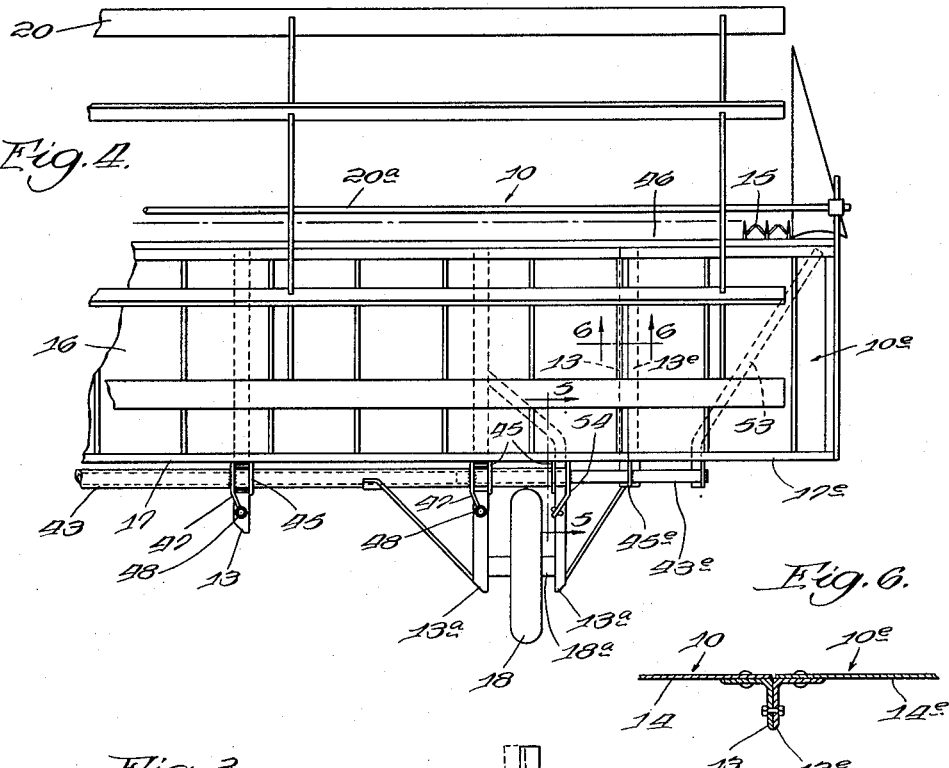
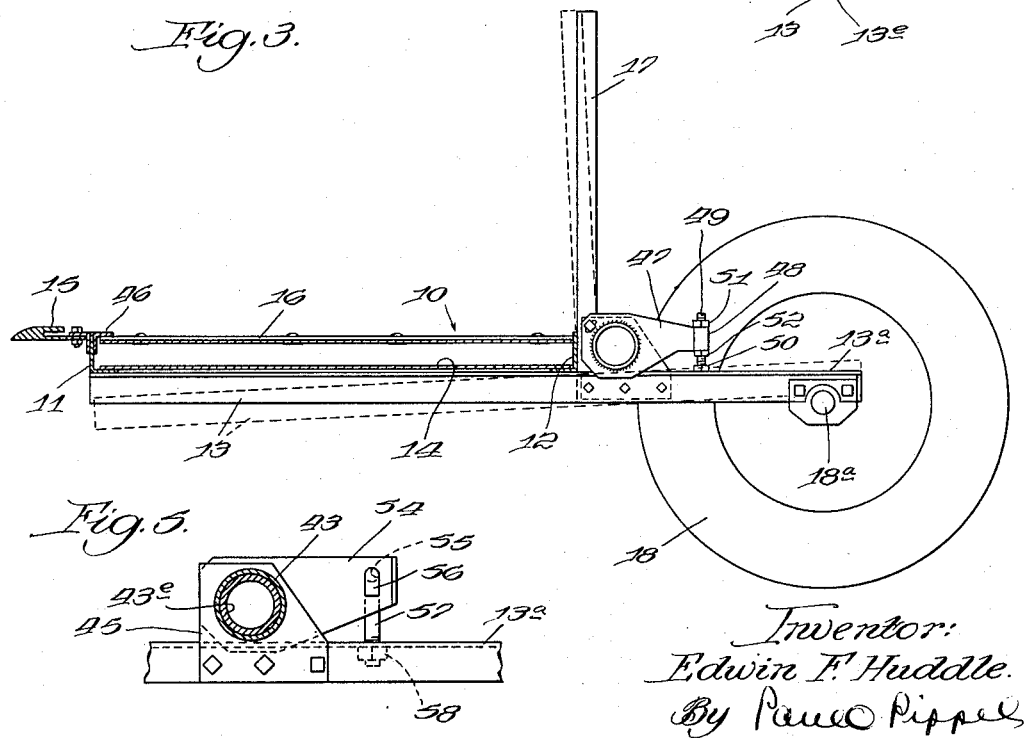

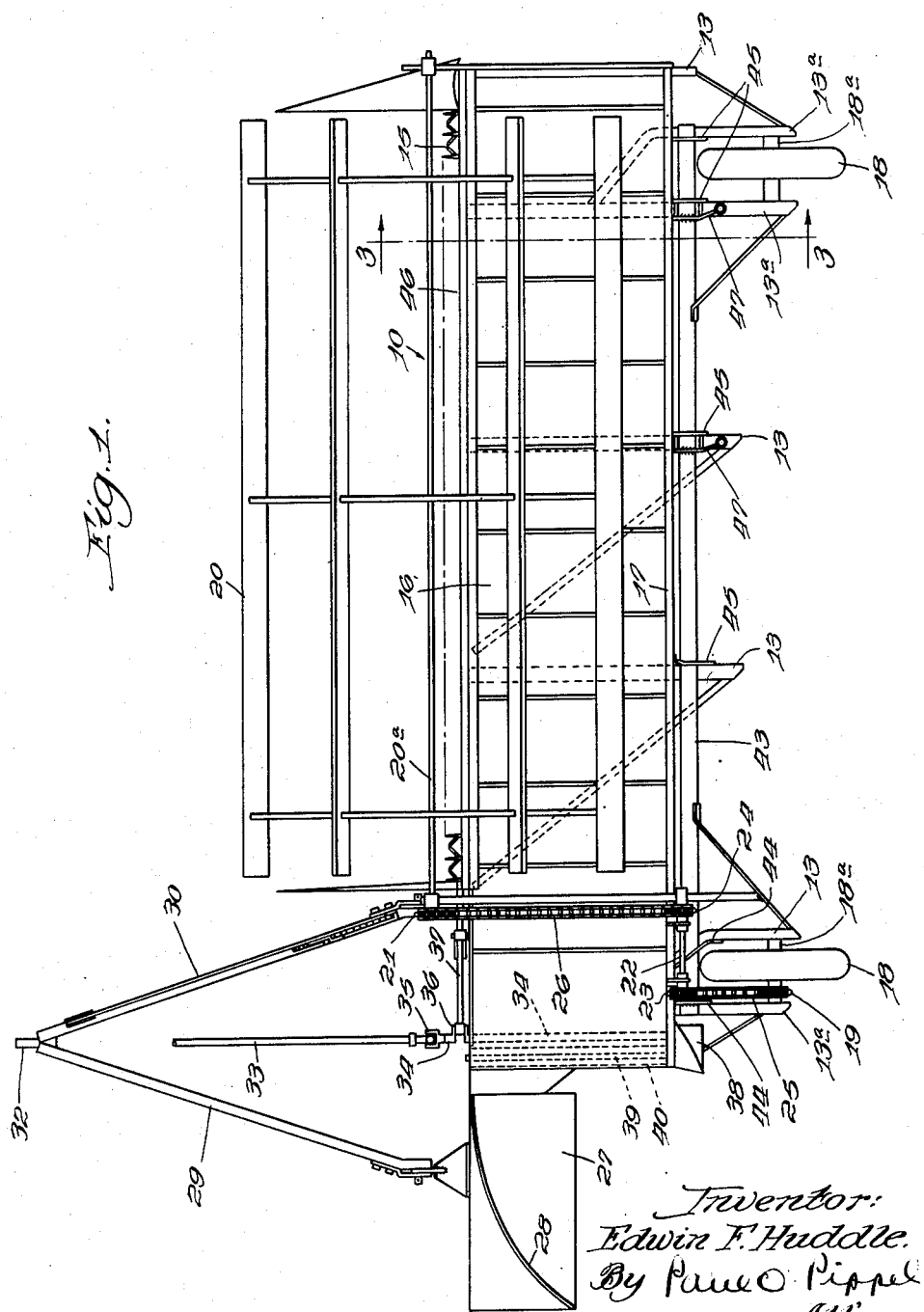

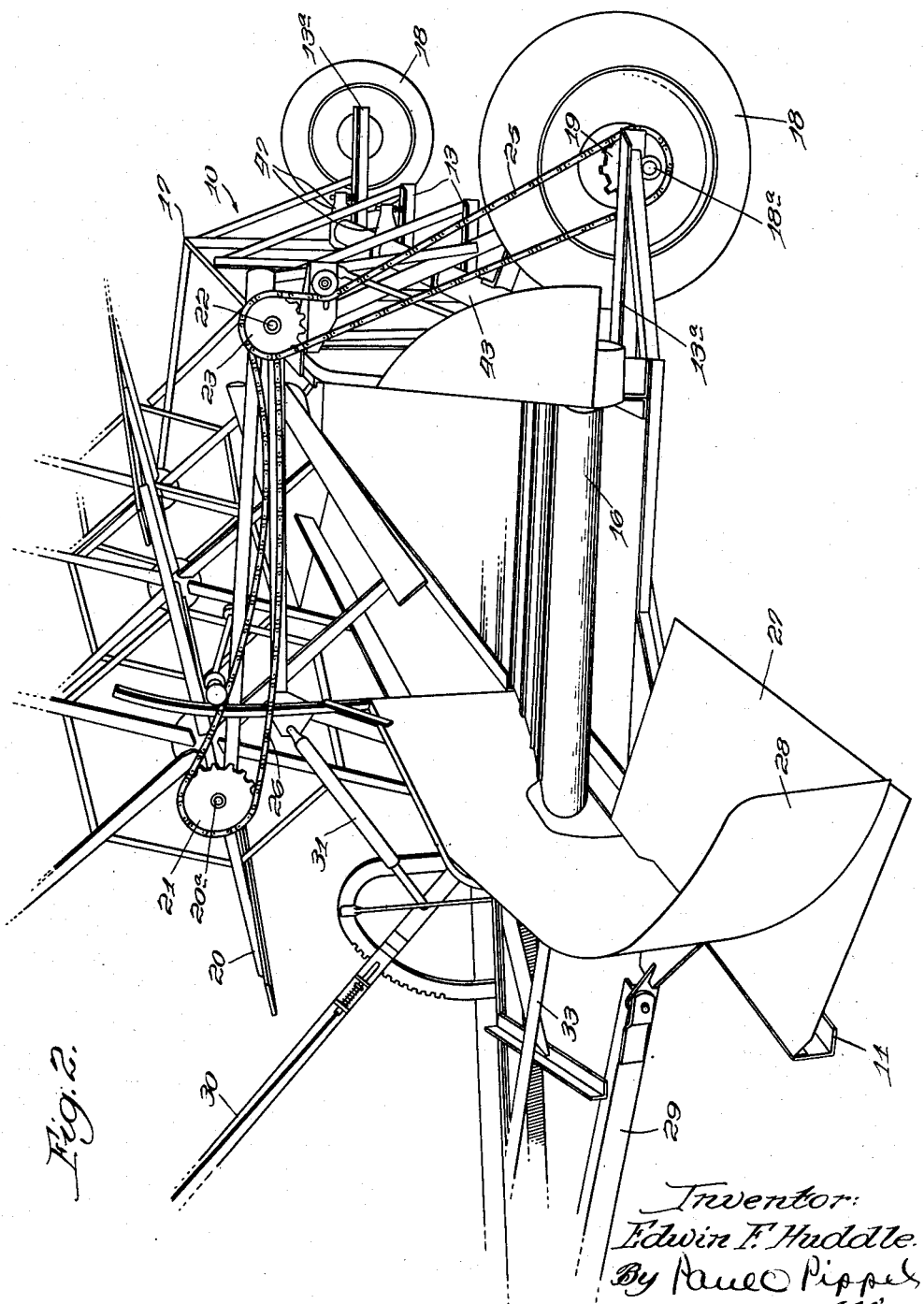

Patented May 25, 1943

2,320,134

UNITED STATES PATENT OFFICE 2,320,134

HARVESTER

Edwin F. Huddle, Elmwood Park, Ill., assignor to International Harvester Company, a corporation of New Jersey Application April 20, 1942, Serial No. 439,649

3 Claims. (Cl. 56—158)

This invention relates to harvesters. More particularly it relates to a novel leveling and supporting device which may be used on harvester and windrower platforms and like machines for maintaining the platform in a plane.

For example, when platforms of considerable length are used, it has long been a problem to maintain them in a plane. Most generally, the outer front end sags downwardly. This is undesirable, since the cutting mechanism provided along the leading edge of the platform will not operate properly and the stubble will be cut at a different height near the outer portion of the platform. Hence, it is necessary that the cutting mechanism be maintained in a plane at all times.

It is an important object of the present invention to provide a novel leveling or platform sag take-up device for harvester platforms.

Another object of the present invention is to provide an improved windrow harvester.

Another object of the present invention is to provide a novel wheel-supporting means for a harvester.

Another object of the present invention is to provide a light-weight windrow harvester.

According to the present invention, a transversely-positioned platform is provided with a plurality of longitudinally disposed members which extend rearwardly of the platform. Adjacent each end of the platform and between a pair of longitudinally extending members are mounted supporting wheels. The platform is provided with a cutting mechanism along its front edge and at the rear of the cutting mechanism is provided a conveyer. The platform is supported and kept in a plane by means of a pipe which is carried at the rear of the platform adjacent the longitudinally extending members. The inner end of the pipe is secured to the platform and the outer end of the pipe is provided with manually adjustable means which may be adjusted against the outer longitudinally extending members, thereby leveling the forward portion or cutting mechanism of the platform.

These and other objects and advantages of the present invention will be apparent to those skilled in the art after a consideration of the following detailed description of the preferred structural embodiment, taken in conjunction with the accompanying drawings.

In the drawings:

Figure 1 is a plan view of a windrower harvester embodying the features of the present invention;

Figure 2 is a perspective view taken from the discharge end of the harvester shown in Figure 1;

Figure 3 is a sectional view taken along the line 3—3 of Figure 1;

Figure 4 is a plan view of the outer portion of the platform with a platform extension attached thereto;

Figure 5 is a sectional view taken along the line 5—5 of Figure 4 and illustrates the novel manually adjustable means for keeping the outer front end of the platform extension in the plane of the remainder of the platform; and Figure 6 is a sectional view taken along the line 6—6 of Figure 4 and illustrates the connection of the platform extension to the main platform structure.

Referring now to the drawings, particularly to Figures 1 and 3, it will be noted that the machine chosen to illustrate the principles of the present invention comprises a transversely positioned platform 10 which comprises transverse front and rear angle members 11 and 12 that are connected by a plurality of spaced longitudinally disposed members 13. A bottom 14 is positioned between the frame members 11 and 12. A conventional type cutting mechanism 15 is secured to the front transverse member 11, and a conveyor 16 is mounted between the transversely positioned members 11 and 12. A backboard 17 extends from the rear transverse angle 12.

The longitudinally disposed members 13 extend rearwardly of the platform backboard 17, and certain of these members near the outer and inner ends of the machine extend further rearwardly, as indicated by the numeral 13a, so as to provide a mounting for the supporting wheels 18. As shown in Figure 1, an axle 18a of the supporting wheels 18 is adapted to be secured to the longitudinally disposed members 13a. A sprocket 19 is mounted on the axle 18a of the supporting wheels 18 near the inner end of the machine so as to be driven thereby.

Above the platform 10 is rotatably mounted a reel 20 having a shaft 20a, which urges the standing grain into the cutting mechanism 15. On the inner end of the reel shaft 20a is secured a sprocket 21. On the backboard 17, adjacent the inner wheel 18 having the sprocket 19 secured thereto, is rotatably mounted a jackshaft 22 on which are secured sprockets 23 and 24. A suitable chain 25 is trained around the sprockets 19 and 23, and a suitable chain 26 is trained around the sprockets 21 and 24. By virtue of this particular drive, the reel 20 is driven from the rotation of one of the land wheels 18 at the same speed at which the machine is moved over the ground.

As shown in Figure 2, the front transverse member 11 extends beyond the inner end of the platform conveyor 16 and carries a stubble-bending plate 27 which extends downwardly and rearwardly. This plate bends the cut stubble forwardly so that the cut material coming from the conveyer 16 can be laid thereon. A suitably curved, vertically disposed plate 28 directs the grain from the conveyor 16 onto the plate 27. The machine is adapted to be moved over the ground by a suitable draft device connected to the inner or discharge end of the platform 10.

Adjacent the discharge end of the conveyer 16 and on the front transverse frame member 11 is pivotally mounted, on a horizontal axis, a hitch device 29. A suitable lever 30 is mounted on the hitch device 29 and is operably connected to the platform 10 by a link 31, as shown in Figure 2. Upon adjustment of the lever 30, the platform 10 can be raised and lowered. The forward portion of the draft device 29 is provided with a hitch plate 32 which may be connected to the draw-bar of a tractor. The drive of the cutting mechanism and the conveyor is accomplished through a suitable drive shaft 33 carried on the hitch device 29.

One end of the shaft 33 positioned on the hitch device 29 may be connected to the power take-off device of a tractor in any suitable manner. The other end of the shaft 33 is connected to a shaft 34 by means of a universal joint 35. The shaft 34 is journaled in the front and rear transverse frame members 11 and 12 and is provided with a crank portion 36 which has a pitman 37 connected thereto and to the cutting mechanism 15. The shaft 34 extends beyond the backboard 17 and into a gear box 38. A second shaft 39 is also journaled in the front and rear transverse frame members 11 and 12 adjacent the shaft 34. The shaft 39, likewise, extends into the gear box 38. Any suitable form of drive means connects the shaft 34 with the shaft 39 within the gear box 38. A roller 40 secured upon the shaft 39 engages the inside of one end of the conveyor 16 and transmits drive to the conveyor from the shaft 39, driven by the shaft 34 through the gear box 38. A suitable clutch means may be provided in the gear box 38 for interrupting the drive of the conveyor 16, but, since such clutch means forms no part of the present invention, it is not shown.

The entire length of the platform 10 is supported and kept in a plane by means of a torque tube 43 which is positioned at the rear of the rear transverse frame member 12 and above the longitudinally positioned members 13 and 13a. As shown in Figure 1, the torque tube 43 extends the entire length of the platform. The left end of the tube 43 extends through and is secured as by welding to suitable plates 44 carried by the longitudinally disposed members 13a at that end. The tube 43 also extends through plates 45 but is not secured to them. The plates 45 are secured to the members 13 and to the members 13a at the right end of the platform.

When the platform 10 is connected to the tractor and supported on the wheels 18, there is a tendency for the right front end of the platform to sag downwardly out of the plane of the remainder of the platform as indicated by the dotted line position of the member 13 in Figure 3. As previously mentioned, this is undesirable, since the cutting mechanism will not operate efficiently when the right end of the platform sags downwardly, for the cutting mechanism also sags and is not kept in a straight line. The outer front end 46 of the platform 10 must be maintained in the position shown in full lines in Figure 3 at all times. This is accomplished by means of the torque tube 43 acting through parts now to be described.

As seen in Figure 1, plate members 47 are secured as by welding to the torque tube 43 adjacent two plates 45 near the right end of the torque tube. The plate members 47 each have a portion extending rearwardly of the torque tube 43, the very end of which portion is formed into a tube 48. A bolt 49 extends through the tube 48, and a member 13 or the member 13a. Nuts 51 and 52 threaded on the bolt 49 at each side of the member 47 fixes the position of the bolt 49. Referring again to Figure 3, it will be noted that upon loosening of the nut 51 and turning the nut 52 on the bolt 49, the head 50 of the bolt 49 will be forced into contact with the longitudinally disposed members 13 and 13a, thereby moving the front end 46 from the position shown in dotted lines into the position shown in full lines. This adjustment can be made very easily if a block is positioned under the outer front end of the platform so that the end of the platform extends slightly upwardly. The nuts 51 and 52 are then tightened the desired amount. Upon removing the block, the outer front end of the platform will then move downwardly into the position shown in full lines in Figure 3.

The platform 10 may be made longer, if desired, by the attachment of a platform extension 10e, as shown in Figure 4. The extension 10e has a backboard 17e, a floor 14e, and an angle-iron member 13e. The member 13e is bolted to the member 13 at the extreme right end of the platform 10 and is secured to a plate 45e secured in turn as by welding to a tube 43e, which extends through the plate 45e. A diagonal member 53 is secured beneath the extension 10e and the rear end thereof is secured to another plate 45e secured as by welding to the tube 43e. One end of the tube 43e fits within the tube 43. A plate member 54, through which the tube 43e extends, is secured to the tube as by welding. A rearwardly extending portion of the plate member 54 has an opening 55 which receives a hooked end 56 of a bolt 57 extending through an opening in one member 13a. A nut 58 retains the bolt 57 in the member 13a, tightening thereof serving to turn the plate member 54 clockwise and thus to level the platform extension 10e by raising it.

The torque tube 43 is so described, because it is an element which is essentially resistant to twisting. This resistance to twisting makes it possible for the adjustment of angular position of the tube 43 with respect to the members 13 and 13a effected through the plate members 47 and the bolts 49 to raise the right, outer end of the platform 10 and thus to eliminate the sag therein. If the torque tube 43 were not resistant to twisting, angular adjustment between the tube 43 and the members 13 and 13a would result in twisting of the tube without a raising of the right end of the platform.

Similarly the tube 43e used with the platform extension 10e must be resistant to twisting, for, when the tube 43e is turned relative to the tube 43 by adjustment of the nut 58 on the bolt 57, this turning is transmitted to the member 53 with a resultant raising of the platform extension 10e.

It will be apparent from the foregoing description that a new and novel means has been provided for supporting a harvester platform.

The intention is to limit the invention only within the scope of the appended claims.

What is claimed is:

1. A construction comprising a platform, supporting wheels positioned at one side of the platform adjacent opposite ends thereof, an element resistant to twisting extending along the said one side of the platform, between the platform and the wheels, a first member connecting one wheel and one end of the platform so as to support the same and being secured to one end of the element against angular movement with respect thereto, a second member connecting the other wheel and the other end of the platform so as to support the same and being connected to the other end of the element so as to be permitted angular movement with respect thereto about the element as an axis, and adjustable means acting between the element and the second member to effect angular movement between the element and the member and thereby to raise the said other end of the platform.

2. A construction comprising a platform, hitch means connecting one end of the platform to a draft means and serving to prevent sag of the said one end of the platform, supporting wheels positioned at one side of the platform adjacent opposite ends thereof, a torque tube extending along the said one side of the platform between the wheel and the platform, a first supporting member connecting one wheel and the said one end of the platform and secured to one end of the torque tube so as to prevent angular movement of the said one end of the torque tube, a second supporting member connecting the other supporting wheel and the other end of the platform and being connected to the other end of the torque tube so as to be permitted angular movement with respect to the torque and about the same as an axis, and adjustable means acting between the said other end of the torque tube and the second member to effect angular movement between these parts and thereby to raise the said other end of the platform.

3. A construction comprising a platform, supporting wheels positioned at one side of the platform adjacent opposite ends thereof, a torque tube extending along the said one side of the platform, means connecting the ends of the platform, the torque tube, and the supporting wheels, a platform extension connected to one end of the platform, an element having an end inserted in the end of the torque tube adjacent the said one end of the platform, means connecting the element and the platform extension, and adjustable means for effecting angular movement between the element and the torque tube thereby to raise the platform extension.

EDWIN F. HUDDLE.

CERTIFICATE OF CORRECTION.

Patent No. 2,320,134.                                                                May 25, 1943.

EDWIN F. HUDDLE.

It is hereby certified that error appears in the printed specification of the above numbered patent requiring correction as follows: Page 3, second column, line 12, claim 2, after the word "torque" insert --tube--; and that the said Letters Patent should be read with this correction therein that the same may conform to the record of the case in the Patent Office.

Signed and sealed this 6th day of July, A. D. 1943.

Henry Van Arsdale, (Seal)                      Acting Commissioner of Patents.

DISCLAIMER 2,320,134.—*Edwin F. Huddle*, Elmwood Park, Ill. HARVESTER. Patent dated May 25, 1943. Disclaimer filed December 8, 1943, by the assignee, *International Harvester Company*.

Hereby enters this disclaimer to claims 1 and 2.

[*Official Gazette January 11, 1944.*]